United States Patent
Okamoto

(10) Patent No.: US 9,158,968 B2
(45) Date of Patent: Oct. 13, 2015

(54) APPARATUS FOR EXTRACTING CHANGED PART OF IMAGE, APPARATUS FOR DISPLAYING CHANGED PART OF IMAGE, AND COMPUTER READABLE MEDIUM

(75) Inventor: Hitoshi Okamoto, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 1033 days.

(21) Appl. No.: 13/104,515

(22) Filed: May 10, 2011

(65) Prior Publication Data

US 2012/0044257 A1 Feb. 23, 2012

(30) Foreign Application Priority Data

Aug. 20, 2010 (JP) ................................. 2010-185513
Jan. 20, 2011 (JP) ................................. 2011-010269

(51) Int. Cl.
*G06K 9/00* (2006.01)

(52) U.S. Cl.
CPC ........ *G06K 9/00483* (2013.01); *G06K 9/00476* (2013.01)

(58) Field of Classification Search
None
See application file for complete search history.

(56) References Cited

U.S. PATENT DOCUMENTS

| | | | | |
|---|---|---|---|---|
| 5,550,937 | A * | 8/1996 | Bell et al. | 382/293 |
| 5,701,403 | A | 12/1997 | Watanabe et al. | |
| 6,041,140 | A * | 3/2000 | Binns et al. | 382/209 |
| 6,434,279 | B1 * | 8/2002 | Shiba | 382/294 |
| 6,961,481 | B2 * | 11/2005 | Lee et al. | 382/300 |
| 7,016,528 | B2 * | 3/2006 | Otani et al. | 382/154 |
| 7,284,861 | B2 * | 10/2007 | Fujieda | 351/206 |
| 7,330,593 | B2 * | 2/2008 | Hong et al. | 382/209 |
| 7,650,047 | B2 * | 1/2010 | Jin et al. | 382/294 |
| 8,478,067 | B2 * | 7/2013 | Riley et al. | 382/276 |
| 8,515,173 | B2 * | 8/2013 | Shudo | 382/180 |
| 8,655,107 | B2 * | 2/2014 | Okamoto | 382/292 |
| 2002/0004710 | A1 | 1/2002 | Murao | |
| 2004/0057611 | A1 * | 3/2004 | Lee et al. | 382/145 |
| 2004/0062439 | A1 * | 4/2004 | Cahill et al. | 382/173 |

(Continued)

FOREIGN PATENT DOCUMENTS

| | | |
|---|---|---|
| JP | 05-089190 A | 4/1993 |
| JP | 07-334534 A | 12/1995 |
| JP | 10-312407 A | 11/1998 |
| JP | 2000-057187 A | 2/2000 |
| JP | 2001-202402 A | 7/2001 |

(Continued)

OTHER PUBLICATIONS

Office Action dated Sep. 24, 2014 issued by the Japanese Patent Office in counterpart Japanese Patent Application No. 2011-010269.

*Primary Examiner* — Thomas Conway
(74) *Attorney, Agent, or Firm* — Sughrue Mion, PLLC

(57) ABSTRACT

An apparatus for extracting a changed part of an image includes a separate graphic-element acquisition unit configured to acquire separate graphic-elements included in each of a first image and a second image and an integrative graphic-element acquisition unit configured to associate the separate graphic-elements with one another based on geometric relation thereamong, and to acquire integrative graphic-elements each including the separate graphic-elements associated with one another. The apparatus further includes a correspondence relation acquisition unit configured to acquire correspondence relation between the integrative graphic-element included in the first image and the integrative graphic-element included in the second image and a changed part extraction unit configured to extract a changed part between the first image and the second image based on the correspondence relation.

13 Claims, 15 Drawing Sheets

(56) References Cited

U.S. PATENT DOCUMENTS

2009/0066513 A1* 3/2009 Kondo et al. .............. 340/572.1
2009/0190800 A1* 7/2009 Takahashi .................. 382/104
2010/0034476 A1* 2/2010 Kido .......................... 382/243
2010/0158375 A1   6/2010 Okamoto
2012/0050496 A1* 3/2012 Nishigaki .................... 348/49

FOREIGN PATENT DOCUMENTS

| JP | 2001-307111 A | 11/2001 |
| JP | 2001-331765 A | 11/2001 |
| JP | 2007-233866 A | 9/2007 |
| JP | 2010-146376 A | 7/2010 |
| WO | 00/21039 | 4/2000 |

* cited by examiner

APPARATUS FOR EXTRACTING CHANGED PART OF IMAGE, APPARATUS FOR DISPLAYING CHANGED PART OF IMAGE, AND COMPUTER READABLE MEDIUM

CROSS-REFERENCE TO RELATED APPLICATION

This application is based on and claims priority under 35 USC 119 from Japanese Patent Application No. 2010-185513 filed on Aug. 20, 2010 and Japanese Patent Application No. 2011-010269 filed on Jan. 20, 2011.

BACKGROUND

Technical Field

The present invention relates to an apparatus for extracting a changed part of an image, an apparatus for displaying a changed part of an image, and a computer readable medium.

SUMMARY

According to an aspect of the invention, an apparatus for extracting a changed part of an image includes:

a separate graphic-element acquisition unit configured to acquire separate graphic-elements included in each of a first image and a second image;

an integrative graphic-element acquisition unit configured to associate the separate graphic-elements with one another based on geometric relation thereamong, and to acquire integrative graphic-elements each including the separate graphic-elements associated with one another;

a correspondence relation acquisition unit configured to acquire correspondence relation between the integrative graphic-element included in the first image and the integrative graphic-element included in the second image; and a changed part extraction unit configured to extract a changed part between the first image and the second image based on the correspondence relation.

BRIEF DESCRIPTION OF THE DRAWINGS

Exemplary embodiments of the invention will be described in detail based on the following figures, wherein.

DETAILED DESCRIPTION

Figure 1:
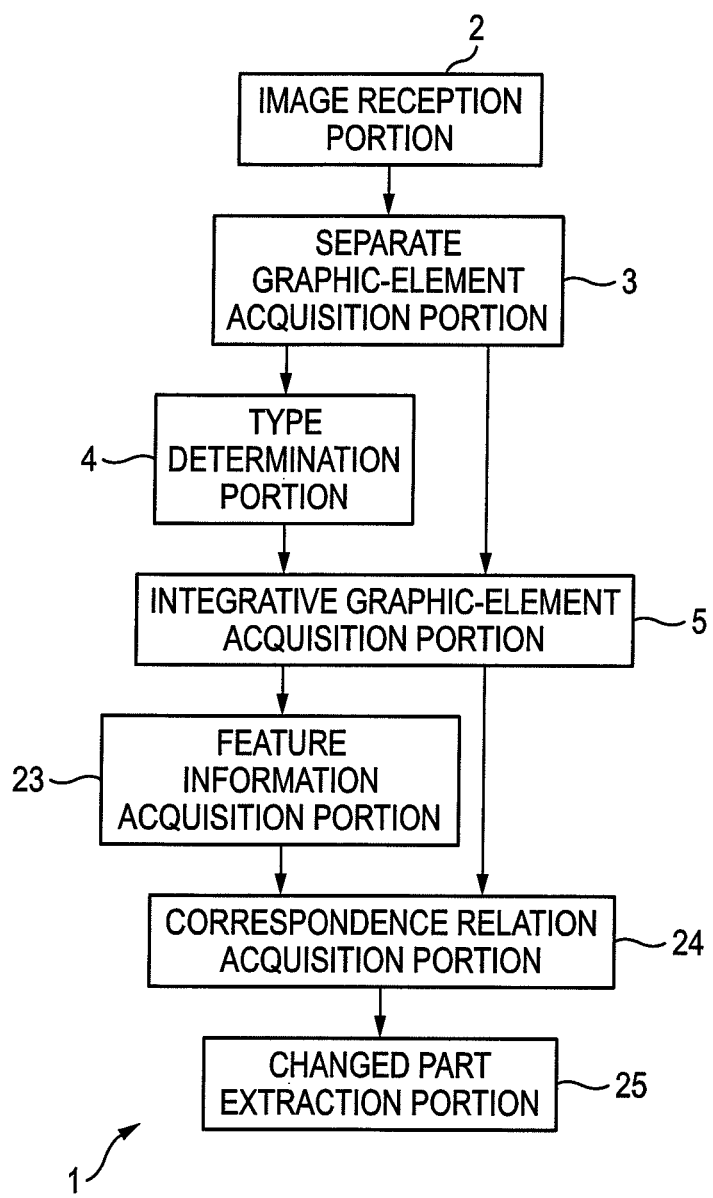
FIG. 1 is a functional block diagram illustrating an apparatus for extracting a changed part of an image according to a first exemplary embodiment of the invention.

FIG. 1 is a functional block diagram illustrating an apparatus 1 for extracting a changed part of an image according to a first exemplary embodiment of the invention.

The apparatus 1 for extracting a changed part of an image is implemented using a general computer which has a central processing unit (CPU), a memory, an input/output interface, and which is physically a general-purpose information processing apparatus. Computer programs for causing the computer to operate as the apparatus 1 for extracting a changed part of an image are executed on the computer. Accordingly, the apparatus 1 for extracting a changed part of an image is virtually implemented. The computer programs for causing the computer to operate as the apparatus 1 for extracting a changed part of an image can be provided either by being recorded in a given information recording medium such as a digital versatile disc read-only memory (DVD-ROM) and a compact disc read-only memory (CD-ROM) or by supplying computer-readable electric signals representing the programs via telecommunication circuits such as public circuits typified by the Internet. Apparently, the information processing apparatus used in implementing the apparatus 1 for extracting a changed part of an image is not limited to general computers. The apparatus 1 for extracting a changed part of an image can be implemented either by a micro-controller or by manufacturing a dedicated apparatus using a digital signal processor (DSP). Alternatively, the apparatus 1 for extracting a changed part of an image can be configured as a singly operable apparatus or as a module mounted on or added to a business machine such as a copying machine and a facsimile.

The functional blocks of the apparatus 1 for extracting a changed part of an image are illustrated in FIG. 1, for the convenience of description of the apparatus 1 therefor implemented by computer programs. Each of the functional blocks doesn't necessarily physically exist.

An image reception portion 2 functioning as an image reception means is an interface for receiving first and second images, from which a changed part is extracted, from an external apparatus. The first and second images are received by the image reception portion 2 as electronic data. Any device can be used as the image reception portion 2, as long as the employed device can receive image information. For example, what is called a socket for input/output of information among processes executed on a computer, an electric communication circuit or a given information recording medium reading apparatus connected to a local area network (LAN) or a wide area network (WAN) including public circuits such as the Internet, or a device such as a scanner for computerizing drawing information recorded on a medium such as paper or a microfilm and for reading the computerized information, and a combination of a plurality of such devices can be employed as the image reception portion 2. Any form of data, e.g., either the form of vector data or that of raster data, can be employed as the form of electronic data received by the image reception portion 2. If the form of electronic data is that of vector data, for the convenience of the subsequent process, the electronic data can be developed into raster data, though this development is not necessary.

Incidentally, the term "changed part" used in the present specification denotes a difference in graphic-element included by each of two images between the two images, which is recognized by those who observes that the graphic-element included in one of the two images is changed in the other image. That is, the difference in position of the graphic-element between the two images is only a change in layout of each of the images. Thus, the difference in position of the graphic-element therebetween is not the "changed part" according to the present specification. Addition, deletion, and size-change of a graphic-element are recognized as differences in the graphic-element itself therebetween and thus included by the "changed part" according to the present specification.

The first and second images received by the image reception portion 2 are transferred to a separate graphic-element acquisition portion 3 functioning as a separate graphic-element acquisition means. The separate graphic-element acquisition means is a means for acquiring separate graphic-elements included in the first and second images. The term "separate graphic-element" designates a "unit of a graphic-element" recognized as a separate graphic-element. More specifically, a set of points connected to one another, which is separated from other graphic-elements by a background color of an image, is a separate graphic-element. A method for recognizing such a separate graphic-element is not limited to a specific one. Any method can be used for recognizing such a separate graphic-element. However, the separate graphic-element acquisition portion 3 recognizes and acquires individual separate graphic-elements by what is called a labeling method.

The separate graphic-elements acquired by the separate graphic-element acquisition portion 3 are transferred to a type determination portion 4 functioning as a type determination means. The type determination means is a means for determining the type of each separate graphic-element. The type determination portion 4 determines the type of each separate graphic-element by studying whether each separate graphic-element satisfies a predetermined feature. What types of separate graphic-elements are employed is not particularly limited to specific ones. Examples of the types of separate graphic-elements are a point, a line segment, a circular arc, a character (including a symbol), a frame, and the like. A method of determining the type of each separate graphic-element is as follows. For example, the type of a separate graphic-element is determined as a point, if the size of the circumscribed rectangle of the separate graphic-element is equal to or less than a predetermined reference value. The type of a separate graphic-element is determined as a line segment, if the width of a shorter side of the circumscribed rectangle of the separate graphic-element is equal to or less than a predetermined reference value, and an aspect ratio (i.e., a ratio of the length of a longer side to a shorter side thereof) is equal to or more than a predetermined criterion value. Although any known method can be used to determine whether type of a separate graphic-element is a circular arc, an example of such a method determines a circular arc as the type of a graphic-element utilizing pattern recognition using generalized Hough transform. The type of a separate graphic-element is determined as a character, if the sizes of a longitudinal width and a transversal width of the separate graphic-element (the lengths of a vertical side and a horizontal side of the circumscribed rectangle thereof, whose sides extend in a vertical direction and a horizontal direction, respectively) are equal to or less than a predetermined reference value, and an aspect ratio is included within a predetermined range. The type of a separate graphic-element is determined as a frame, if the size of the outer shape of the separate graphic-element is equal to or larger than a predetermined reference value, e.g., if each of the longitudinal width and the transversal width of the outer shape thereof is equal to or more than 80% of an associated one of the longitudinal width and the transversal width of an image itself including the separate graphic-element. The type of a separate graphic-element is determined as another type of a graphic-element, if the separate graphic-element does not satisfy the above conditions at all. The above determination methods are exemplified methods. The determination methods according to the invention are not limited thereto. Additional types other than the above types can be employed. In this case, it is advisable to use determination methods respectively corresponding to the additional types. For example, the type of a separate graphic-element can be determined as an ellipse, a rectangle, a fragment of a regular polygon or the like, using the generalized Hough transform, similarly to the case of determining the type as a circular arc. According to this exemplary embodiment, because it is generally often that the size of a character (i.e., the number of points configuring the character) is preliminarily determined from the viewpoint of legibility of the character and the basis for generating an image, the above criterion is employed for determining whether the separate graphic-element is a character. Alternatively, the type of a separate graphic-element recognized as a character by performing character recognition employed in, e.g., optical character recognition (OCR) can be determined as a character.

Information representing the separate graphic-elements acquired by the separate graphic-element acquisition portion 3 and the types of the separate graphic-elements, which are determined by the type determination portion 4, is transferred to an integrative graphic-element acquisition portion 5 functioning as an integrative graphic-element acquisition means. The integrative graphic-element acquisition means is a means for associating separate graphic-elements with one another and acquiring each integrative graphic-element that includes the separate graphic-elements associated with one another. More specifically, even if a plurality of separate graphic-elements are independent of one another, the plurality of separate graphic-elements have some meaning as a whole by arranging the plurality of separate graphic-elements in a certain arrangement to have certain relation thereamong. In such a case, one integrative graphic-element can be obtained by integrating such separate graphic-elements. For example, a dashed line is such that individual short line segments are arranged collaterally. A dashed line is obtained as an integrative graphic-element by associating and integrating individual short line segments serving as separate graphic-elements with one another. It is determined, based on the geometric relation among the separate graphic-elements whether each separate graphic-element can be associated with another separate graphic-element.

Hereinafter, an example of a method for associating separate graphic-elements corresponding to each type with one another is described by referring to FIGS. 2A to 2F.

Figure 2A:
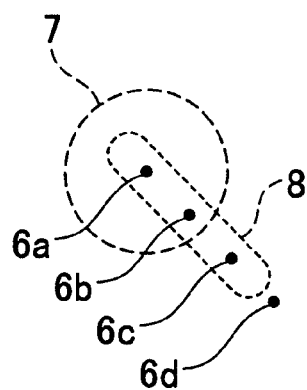
FIG. 2A is a view illustrating an association method in a case where target separate graphic-elements of the method are points.

FIG. 2A is a view illustrating an association method in a case where a target separate graphic-element is a point 6a. In FIG. 2A, points 6a to 6d are separate graphic-elements, the type of all of which is determined to be a point. Attention is now focused on the point 6a. However, attention can optionally be focused on any other points. The point 6a is illustrated only as an example of a point on which attention is focused. The integrative graphic-element acquisition portion 5 (see FIG. 1) searches a predetermined search range 7 around such a point 6a, e.g., a circular region having a certain radius for another separate graphic-element at least a part of which is included in such a region. The search range 7 is illustrated as a region surrounded by dashed lines. It is assumed that then, a point 6b is found. As illustrated in FIG. 2A, when such a separate graphic-element whose type is determined as a point is found, the points 6a and 6b have a high probability of configuring a part of a dotted line. Thus, the integrative graphic-element acquisition portion 5 (see FIG. 1) then searches a region extending along a line connecting the points 6a and 6b to each other as a new search range 8 for a further separate graphic-element. The search range 8 is illustrated as another region surrounded by a dashed line. It is further assumed that another point 6c is found. Subsequently, a similar process is repeated. Consequently, all points 6a to 6d are found, which are separate graphic-elements configuring a dotted line. The separate graphic-elements found in this manner are associated with one another by the integrative graphic-element acquisition portion 5 (see FIG. 1), so that one integrative graphic-element is acquired as a dotted line configured by the points 6a to 6d associated with one another.

Figure 2B:
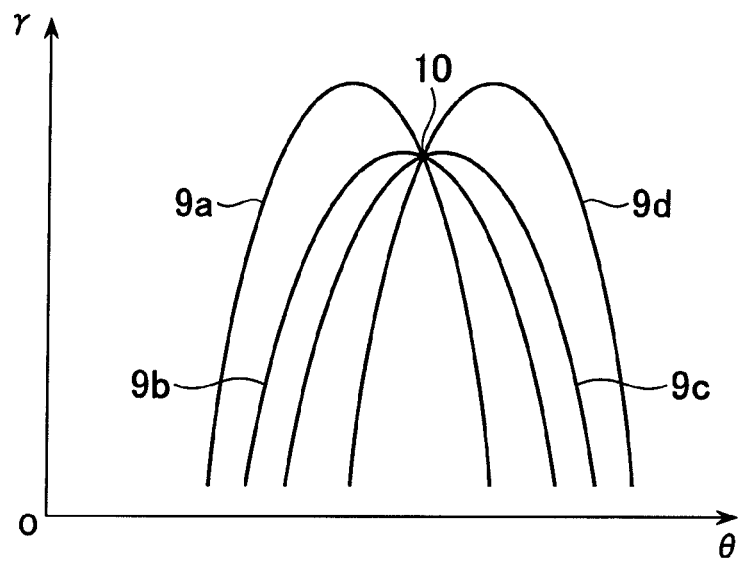
FIG. 2B is a graph illustrating a result obtained by performing Hough transform on an image present around a point 6a illustrated in FIG. 2A.

Other methods can be used to acquire a dotted line as an integrative graphic-element. An example of such methods is a method using Hough transform is descried hereinafter. To describe with reference to the example of a dotted line illustrated in FIG. 2A, first, if an attention separate graphic-element is a point (i.e., a point 6a in this case), Hough transform is performed on at least an image surrounding the point 6a. It is preferable for reducing an amount of calculation that, e.g., a region within a circle having a predetermined radius around the attention point is set to be a target region of Hough transform. However, Hough transform can be performed on the entire image. FIG. 2B is a graph obtained by performing Hough transform on the image around the point 6a. A given point is represented as a sine curve in a Hough space by performing Hough transform thereon. A sine curve 9a corresponds to the point 6a. The axis of ordinates of the graph represents a distance $\gamma$ from a given origin to a straight line passing through a point, and the axis of abscissas represents an angle $\theta$ of the straight line passing through the point. Similarly, the points 6b to 6d are plotted as sine curves 9b to 9d respectively corresponding to the points 6b to 6d. If the points 6a to 6d are arranged on a straight line, the sine curves 9a to 9d intersect at a point 10 with one another. Accordingly, if such a point 10 having a large number of votes (i.e., a large number of other sine curves pass therethrough) is present on the sine curve 9a in the Hough space obtained by performing Hough transform on the point 6a, the point 6a has a high probability of being a part of a graphic-element obtained by arranging a large number of points on a straight line, i.e., a point configuring a dotted line. The angle of the dotted line is represented by the abscissa $\theta$ of the point 10 in the Hough space. Then, the integrative graphic-element acquisition portion 5 searches a region extending along the obtained dotted line at an associated angle as a search range for another separate graphic-element. Consequently, a dotted line is acquired as an integrative graphic-element, similarly to the above example. The search range at that time has a shape similar to that of the search range 8 illustrated in FIG. 2A.

Figure 2C:
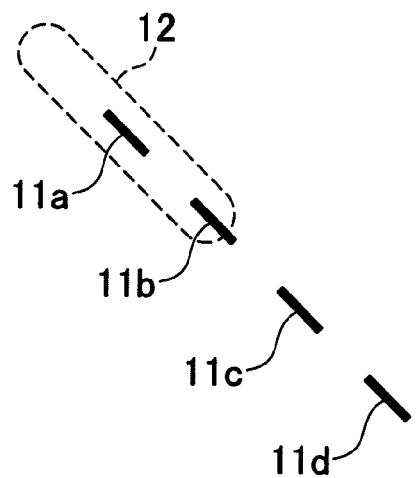
FIG. 2C is a view illustrating an association method in a case where target separate graphic-elements of this method are line segments.

FIG. 2C is a view illustrating an association method in a case where a target separate graphic-element is a line segment 11a. The line segments 11a to 11d illustrated in FIG. 2C are separate graphic-elements, the type of all of which is determined to be a line segment. If attention is focused on the line segment 11a, the integrative graphic-element acquisition portion 5 (see FIG. 1) sets, around the line segment 11a, a search range 12 extending in a longitudinal direction of the line segment 11a for a separate graphic-element at least a part of which is included in the search range 12. In this example, the line segment 11b is found. Subsequently, a new search range is similarly set corresponding to the line segment 11b. All the line segments 11a to 11d are found and associated with one another. Consequently, a dashed line serving as one integrative graphic-element configured by the line segments 11a to 11d is acquired. Generally, it is often that the lengths of the line segments configuring a dashed line are within a certain range. Therefore, if the separate graphic-element is a line segment, an upper limit to the length of the line segment can be provided when the above handling thereof is performed. It is advisable to handle a line segment, whose length exceeds such an upper limit, similarly to the handling of other separate graphic-elements which will be described below.

Figure 2D:
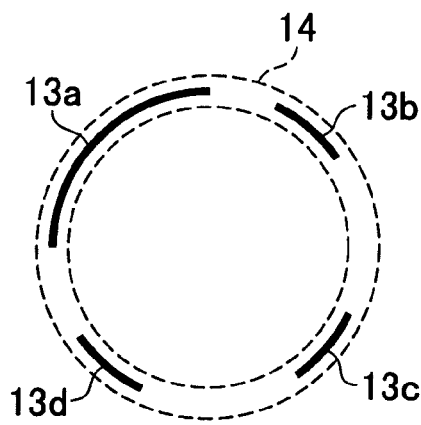
FIG. 2D is a view illustrating an association method in a case where target separate graphic-elements of this method are circular arcs.

FIG. 2D is a view illustrating an association method in a case where the target separate graphic-element is a circular arc 13a. Circular arcs 13a to 13d illustrated in FIG. 2D are separate graphic-elements the type of all of which is determined as a circular arc. If attention is focused on the circular arc 13a, the integrative graphic-element acquisition portion 5 (see FIG. 1) sets a search range 14 extending on the circumference of a circle, a part of which is the circular arc 13a. Then, the circular arcs 13b to 13d are found and associated with one another, each of which serves as a separate graphic-element having a center and a radius that are common to the circular arc 13a are found. Consequently, the circular arcs 13a to 13d having the same center and the same radius are acquired as an integrative graphic-element. When the determination of the type of each circular arc by the type determination portion 4 (see FIG. 1) is performed using generalized Hough transform, the coordinate of the center and the radius of a circle including each target circular arc as a part thereof are obtained. Accordingly, the search range 14 can easily be set.

Figure 2E:
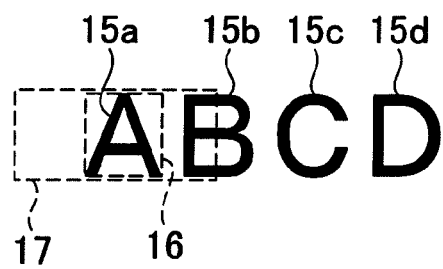
FIG. 2E is a view illustrating an association method in a case where target separate graphic-elements of this method are characters.

FIG. 2E is a view illustrating an association method in a case where the type of target separate graphic-elements is a character. Characters 15a to 15d illustrated in FIG. 2E are separate graphic-elements the type of all of which is determined as a character. If attention is focused on the character 15a, the integrative graphic-element acquisition portion 5 (see FIG. 1) sets a search range 17 obtained by laterally extending the circumscribed rectangle 16 of the character 15a, because the characters are horizontally written in an image handled in this case. The characters are hardly rotated. Thus, it is preferred that the direction of each side of the circumscribed rectangle 16 coincides with the longitudinal direction or the lateral direction of an image. Consequently, the character 15b is found and associated with the character 15a. A similar process is performed on the character 15b. Subsequently, the similar process is repeated. Thus, all of a series of the characters 15a to 15d are found and associated with one another. In addition, the characters associated with one another are acquired as one integrative graphic-element. In the foregoing description, on the assumption that the characters are horizontally written, it has been described that the search range 17 laterally extends. However, it is advisable to set, when the characters are vertically written, the search range 17 to extend in an up-down direction.

Figure 2F:
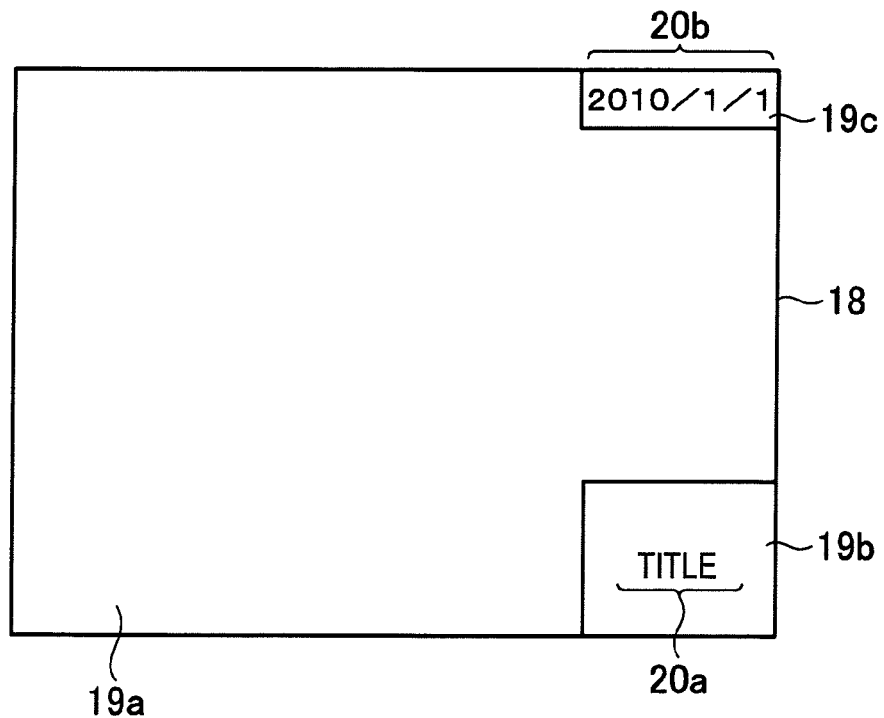
FIG. 2F is a view illustrating an association method in a case where target separate graphic-elements of this method are frames.

FIG. 2F is a view illustrating an association method in a case where a target separate graphic-element is a frame. In a frame 18, regions surrounded by the frame are present. That is, regions 19a, 19b, and 19c are present therein. In general drawings, the maximum one 19a of the regions surrounded by the frame is an area on which various other separate graphic-elements are drawn. The other regions 19b and 19c are areas in each of which information associated with the frame, such as a title, a business owner, a composer, and a date, is entered. Then, the integrative graphic-element acquisition portion 5 (see FIG. 1) associates separate graphic-elements 20a and 20b included in the other regions 19b and 19c except at least the maximum region 19a with the frame 18. Whether the region is a maximum one can be determined using any method, e.g., by comparing the sizes of the outer shapes of the regions, alternatively, by comparing the areas of the regions.

Figure 2G:
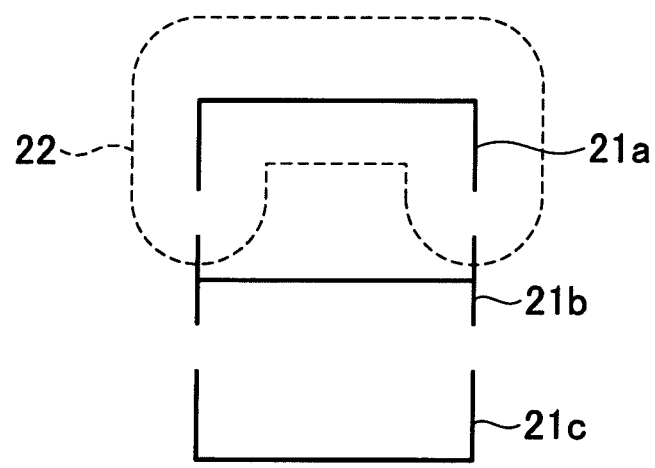
FIG. 2G is a view illustrating an association method in a case where other graphic-elements are employed as the target separate graphic-elements of this method.

FIG. 2G is a view illustrating an association method in a case where a target separate graphic-element is a graphic-element of another type. In this case, the integrative separate graphic-element acquisition portion 5 (see FIG. 1) sets a search range 22 having a predetermined width around a target separate graphic-element 21a. Consequently, a separate graphic-elements is found, which is located at a distance shorter than a predetermined value from the separate graphic-element 21a. Then, the found separate graphic-element is associated with the separate graphic-element 21a. In the example illustrated in FIG. 2G, the separate graphic-element 21b is found and associated with the separate graphic-element 21a. A similar process is performed on the separate graphic-element 21b associated therewith. In this example, one integrative graphic-element configured by the separate graphic-elements 21a to 21c is obtained.

As described above, according to the present exemplary embodiment, the integrative graphic-element acquisition portion 5 (see FIG. 1) uses a criterion according to the type of a separate graphic-element determined by the type determination portion 4. The integrative graphic-element acquisition portion 5 associates the separate graphic-elements based on the geometrical relation thereamong and acquires an integrative graphic-element configured by the separate graphic-elements associated with one another. However, it is not necessary to use a criterion according to the type of the separate graphic-element. The same criterion, e.g., the criterion in the above case where a target separate graphic-element is a graphic-element of another type, can be used for all the separate graphic-elements. In this case, the type determination is unnecessary. The separate graphic-elements can be associated portion 4 with one another by any method. For example, identification information common to the separate graphic-elements associated with one another is given to data representing the separate graphic-elements. Alternatively, data representing the obtained integrative graphic-element is caused to include identification identifying the separate graphic-elements included in the integrative graphic-element. In addition, in a case where the graphic-elements of the types other than the individually above-described types, e.g., an ellipse, a rectangle, a fragment of a regular polygon or the like are determined as the separate graphic-elements, a process similar to that performed in the above case of determining a circular arc as the type can be performed.

Referring back to FIG. 1, the integrative graphic-element acquired by the integrative graphic-element acquisition portion 5 is transferred to a feature information acquisition portion 23 functioning as a feature information acquisition means. The feature information acquisition means is a means configured to acquire feature information of a integrative graphic-element. The feature information is information representing a certain feature of an integrative graphic-element. The features include various features including geometric features such as the longitudinal width and the transversal width of an integrative graphic-element, the coordinates of the center of gravity, the aspect ratio of the circumscribed rectangle of a graphic-element, the area of the circumscribed rectangle, the number of colored pixels (i.e., pixels whose colors are not a background color), the rate of colored pixels in the circumscribed rectangle, the number of separate graphic-elements included in an integrative graphic-element, and the composition ratio of the types of separate graphic-elements included therein. The feature information acquisition portion 23 acquires an optional one or a plurality of pieces of various feature information corresponding to each integrative geometric-feature. According to the present exemplary embodiment, the feature information acquisition portion 23 is configured to acquire the longitudinal width and the transverse width of an integrative graphic-element, the coordinates of the center of gravity thereof, and the number of colored pixels. However, the feature information acquisition portion according to the invention is not limited thereto.

Then, the integrative graphic-element acquired by the integrative graphic-element acquisition portion 5 and the feature information acquired by the feature information acquisition portion 23 are transferred to a correspondence relation acquisition portion 24 functioning as a correspondence relation acquisition means. The correspondence relation acquisition means is a means for acquiring the correspondence relation between an integrative graphic-element included in a first image and that included in a second image. More particularly, in a case where a certain change is caused in the first image, so that a second image is generated, and where, among integrative graphic-elements included in the first images, an integrative graphic-element subjected to no change is present, the same integrative graphic-element corresponding thereto is present in the second image. If one of integrative graphic-elements included in the first image undergoes certain change, e.g., a partial addition or deletion, an integrative graphic-element partially differing from and being mostly common to the partially-changed integrative graphic-element in the first image is present in the second image. Such an integrative graphic-element included in the first image is associated with such an integrative graphic-element included in the second image. In addition, if an integrative graphic-element included in the first image is deleted, no corresponding integrative graphic-element is present in the second image. If an integrative graphic-element being absent in the first image is newly added thereto, similarly, an integrative graphic-element whose corresponding integrative graphic-element is absent in the first image is present in the second image. That is, the correspondence relation acquisition means is a means for acquiring, as information representing correspondence relation, information representing whether there is an integrative graphic-element included in one image, which corresponds to an integrative graphic-element included in another image and representing which of integrative graphic-elements corresponds thereto, if there is such an integrative graphic-element included in the one image.

According to the present exemplary embodiment, the correspondence relation acquisition portion 24 acquires information representing correspondence relation by applying a pattern matching method to one of integrative graphic-elements included in a first image and one of integrative graphic-elements included in a second image, which are expected based on feature information acquired by the feature information acquisition portion 23 to correspond to each other. That is, the correspondence relation acquisition portion 24 acquires information representing correspondence relation between the integrative graphic-element included in the first image and the integrative graphic-element included in the second image, based on the feature information, by pattern-matching.

First, the correspondence relation acquisition portion 24 focuses attention on a given integrative graphic-element included in the first image. Then, the correspondence relation acquisition portion 24 searches for an integrative graphic-element included in the second image, whose feature information is similar to feature information of the given integrative graphic-element. At that time, the types of the feature information and the number of pieces of the feature information can optionally be set. In addition, it can optionally be determined how an index indicating the degree of resemblance between integrative graphic-elements (hereinafter referred to as a resemblance index) is set. According to this exemplary embodiment, the longitudinal width, the transverse width, the coordinates of the center of gravity, and an absolute value of the difference between the numbers of colored pixels are acquired and used as feature instruction. In addition, according to this exemplary embodiment, a total of the longitudinal width, the transverse width, the coordinates of the center of gravity, and an absolute value of the difference between the numbers of colored pixels is set to be a resemblance index. In this case, it is indicated that he smaller the value of the resemblance index, the more the integrative graphic-elements resemble each other. When the resemblance index corresponding to each of the integrative graphic-elements included in the second image is obtained, it is estimated that the more the integrative graphic-element resembles the attention integrative graphic-element, the smaller the value of the resemblance index becomes, while the more the integrative graphic-element differs from the attention integrative graphic-element, the larger the value of the resemblance index becomes.

Then, the correspondence relation acquisition portion 24 obtains the degree of commonality between the attention integrative graphic-element included in the first image and the integrative graphic-element included in the second image, using what is called a pattern-matching method. At that time, the integrative graphic-elements included in the second image are subjected to pattern-matching sequentially in the ascending order of the value of the resemblance index. That is, pattern-matching is performed on the integrative graphic-elements included in the second image sequentially in the descending order of the estimated degree of resemblance to the attention integrative graphic-element. If it is determined that a result of the pattern-matching is affirmative, i.e., the degree of commonality between the attention integrative graphic-element included in the first image and the selected integrative graphic-element included in the second image is equal to or higher than a certain level, it is determined that such integrative graphic-elements correspond to each other. The determination criterion can optionally be set. However, for example, if 80% or more of one of the integrative graphic-elements respectively included in the first and second images are also included in the other integrative graphic-element, it can be determined that both the integrative graphic-elements respectively included in the first and second images correspond to each other. Preferably, at that time, a deviation in the relative position between the integrative graphic-elements respectively included in the first image and the second image, which correspond to each other, is obtained. After the correspondence relation acquisition portion 24 searches all the integrative graphic-elements included in the second image for the integrative graphic-element which corresponds to the integrative graphic-element included in the first image, if no integrative graphic-element included in the second image is found which corresponds to the integrative graphic-element included in the first image, it is determined that this integrative graphic-element included in the first image has no corresponding integrative graphic-element included in the second image.

The above method performed by the correspondence relation acquisition portion 24 for acquiring the correspondence relation between the integrative graphic-element included in the first image and that included in the second image is mere an example of the method of acquiring the correspondence relation therebetween. Any method can be used to acquire the correspondence relation therebetween, as long as the method is a rational method of acquiring the correspondence relation. For example, the correspondence relation can be acquired, based only on the feature information. Alternatively, the correspondence relation can be acquired only by pattern-matching, without using the feature information. In addition, according to a method of performing pattern-matching based on the feature information, similarly to the method described in the present exemplary embodiment, an integrative graphic-element having a highest comprehensive index can be made to correspond to the attention integrative graphic-element by obtaining the comprehensive index based on both of the feature information and the pattern-matching through combination of an index concerning commonality obtained from the feature information and an index concerning commonality obtained as a result of pattern-matching.

Then, the correspondence relation acquired by the correspondence relation acquisition portion 24 is transferred to a changed part extraction portion 25 functioning as a changed part extraction means. The changed part extraction means is a means configured to extract a changed part between the first image and the second image, based on the correspondence relation. The changed part extraction portion 25 obtains a difference between the integrative graphic-element included in the first image and the corresponding integrative graphic-element included in the second image based on the correspondence relation. At that time, the parallel translation of one or both of the integrative graphic-element included in the first image and the corresponding integrative graphic-element included in the second image is performed to eliminate a deviation in relative position between the integrative graphic-element included in the first image and the corresponding integrative graphic-element included in the second image. Consequently, a substantial difference between the integrative graphic-elements other than a mere positional difference therebetween, thus, a changed part corresponding to such a difference is extracted. When the correspondence relation acquisition portion 24 performs pattern-matching between the integrative graphic-elements respectively included in the first and second images, the deviation in the relative position is acquired as a relative positional relation when the degree of commonality between both the integrative graphic-elements respectively included in the first and second images is highest. However, the method of acquiring the deviation in the relative position is not limited thereto. Alternatively, the deviation in the relative position can be obtained according to the feature information.

The obtained difference is the changed part of the integrative graphic-element between the first image and the second image. The changed part extraction portion 25 outputs such a changed part to another additional device or a functional block at a further subsequent stage. The additional device or the functional block according to the present exemplary embodiment is not limited to a specific one. However, examples of the additional device or the functional block are a display device, such as a monitor, for displaying a changed part, a print device, such as a printer, for printing a changed part, an information recording medium, such as a hard disk drive, for storing information concerning a changed part, and a communication circuit connected to another computer using a changed part.

The correspondence relation acquisition portion 24 can associate a single integrative graphic-element with at most another single integrative graphic-element.

Figure 7A:
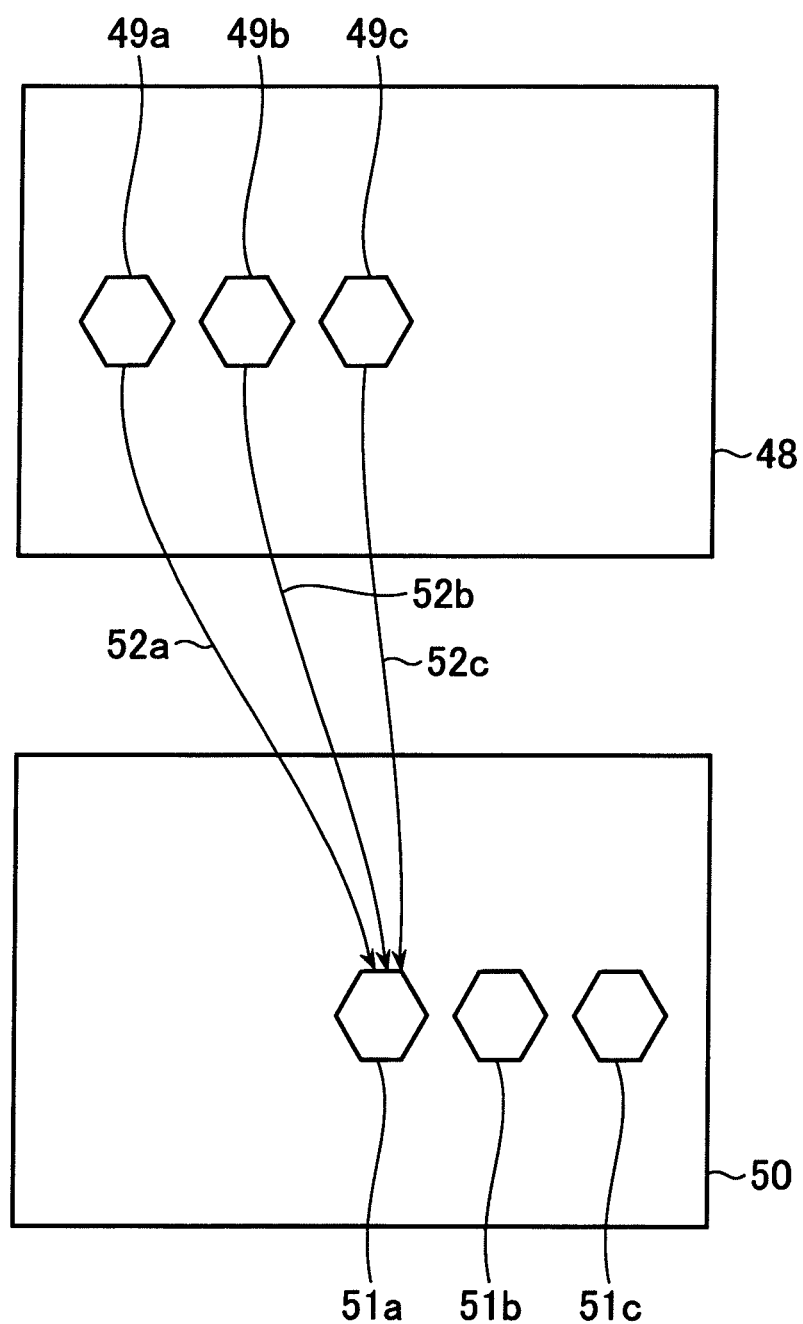
FIG. 7A is a view illustrating an example of association performed by a correspondence relation acquisition portion illustrated in FIG. 1.
Figure 7B:
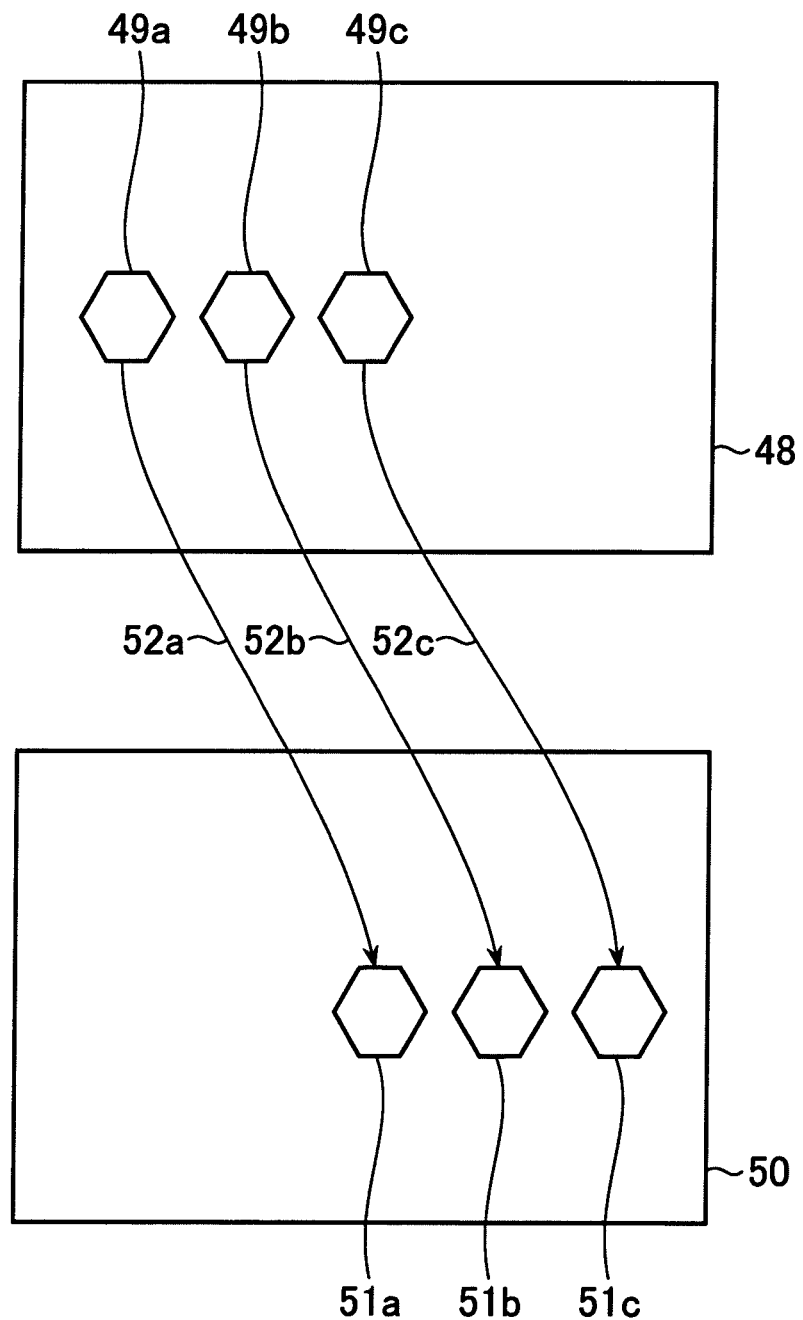
FIG. 7B is a view illustrating an example of association performed by the correspondence relation acquisition portion in a case where the correspondence relation acquisition portion associates a single integrative graphic-element with at most one another integrative graphic-element.

This association process is described hereinafter with reference to FIGS. 7A and 7B. FIG. 7A is a view illustrating an example of association performed by the correspondence relation acquisition portion 24. In the example illustrated in FIG. 7A, it is assumed that the correspondence relation acquisition portion 24 does not associate a single integrative graphic-element with at most another single integrative graphic-element.

A first image 48 illustrated in FIG. 7A is such that the outer shape of the first image 48 is a rectangle, as illustrated in FIG. 7A, and that the first image 48 includes integrative graphic-elements 49a, 49b, and 49c. The integrative graphic-elements 49a, 49b, and 49c are the same graphic-elements except for the positions thereof. A second image 50 has an outer shape which is the same as that of the first image 48 and includes integrative graphic-elements 49a, 49b, and 49c. The positional relation between integrative graphic-elements 51a, 51b, and 51c and those 49a, 49b, and 49c is assumed such that the integrative graphic-elements 51a, 51b, and 51c are respectively obtained by the rightward parallel translation of each of the integrative graphic-elements 49a, 49b, and 49c, as viewed in FIGS. 7A and 7B.

At that time, the correspondence relation acquisition portion 24 selects, from the second image 50, integrative graphic-elements determined such that the difference in the feature information therefrom to the integrative graphic-element 49a in the first image 48 is smallest (i.e., the value of the resemblance index is smallest), and that the degree of commonality of each selected integrative graphic-element is estimated as a result of pattern-matching to be equal to or higher than a certain level. Then, the correspondence relation acquisition portion 24 associates the integrative graphic-element 49a with each selected integrative graphic-element. In this case, the integrative graphic-element 51a is selected, the position of the center of gravity of which is closest to the integrative graphic-element 49a. This correspondence relation is indicated by arrow 52a in the figure.

Then, the correspondence relation acquisition portion 24 associates each of the integrative graphic-elements with the integrative graphic-elements included in the second image. In this case, similarly, the integrative graphic-element 51a is selected (as indicated by arrows 52b and 52c), the position of the center of gravity of which is closest to the integrative graphic-elements 49b, 49c.

As a result, all the integrative graphic-elements 49a, 49b, and 49c are associated with the integrative graphic-element 51a. The integrative graphic-elements 51b and 51c are not associated with those 49a, 49b, and 49c included in the first image 48. Accordingly, the change-part extraction portion 25 (see FIG. 1) at a subsequent stage extracts the integrative graphic-elements 51b and 51c as changed parts added in the second image 50 to the first image 48 (or the changed part deleted in the first image 48 from the second image 50).

An example of association by the correspondence relation acquisition portion 24 is described with reference to FIG. 7B, in the case where a single integrative graphic-element is associated with at most another single integrative graphic-element.

In this case, similarly to the above case, the correspondence relation acquisition portion 24 associates the integrative graphic-element 49a included in the first image 48 with the integrative graphic-element 51a selected from the second image 50 (as indicated by an arrow 52a), which is determined such that the difference in the feature information therefrom to the integrative graphic-element 49a in the first image 48 is smallest (i.e., the value of the resemblance index is smallest), and that the degree of commonality of each selected integrative graphic-element is estimated as a result of pattern-matching to be equal to or higher than a certain level. Then, although an integrative graphic-element included in the second image 50 to be smallest in the difference in the feature information from the next integrative graphic-element 49b is the integrative graphic-element 51a. However, the integrative graphic-element 49a has been associated with that 51a. Thus, the integrative graphic-element 51b included in the second image 50 to be the second smallest in the difference in the feature information from the next integrative graphic-element 49b is selected and associated therewith (as indicated by arrow 52b). Similarly, the integrative graphic-element 51c is associated with the integrative graphic-element 49c (as indicated by arrow 52c).

As a result, the changed part extraction portion 25 (see FIG. 1) at a subsequent stage calculates the difference between the integrative graphic-element 49a and the integrative graphic-element 51a, the difference between the integrative graphic-element 49b and the integrative graphic-element 51b, and the difference between the integrative graphic-element 49c and the integrative graphic-element 51c. However, in this example, such differences cannot be obtained. Thus, the changed part cannot be extracted.

There have been devised various methods for associating a single integrative graphic-element with at most another single integrative graphic-element. Although any of such methods can be used, according to the present exemplary embodiment, an algorithm described in the following description is used.

Figure 8:
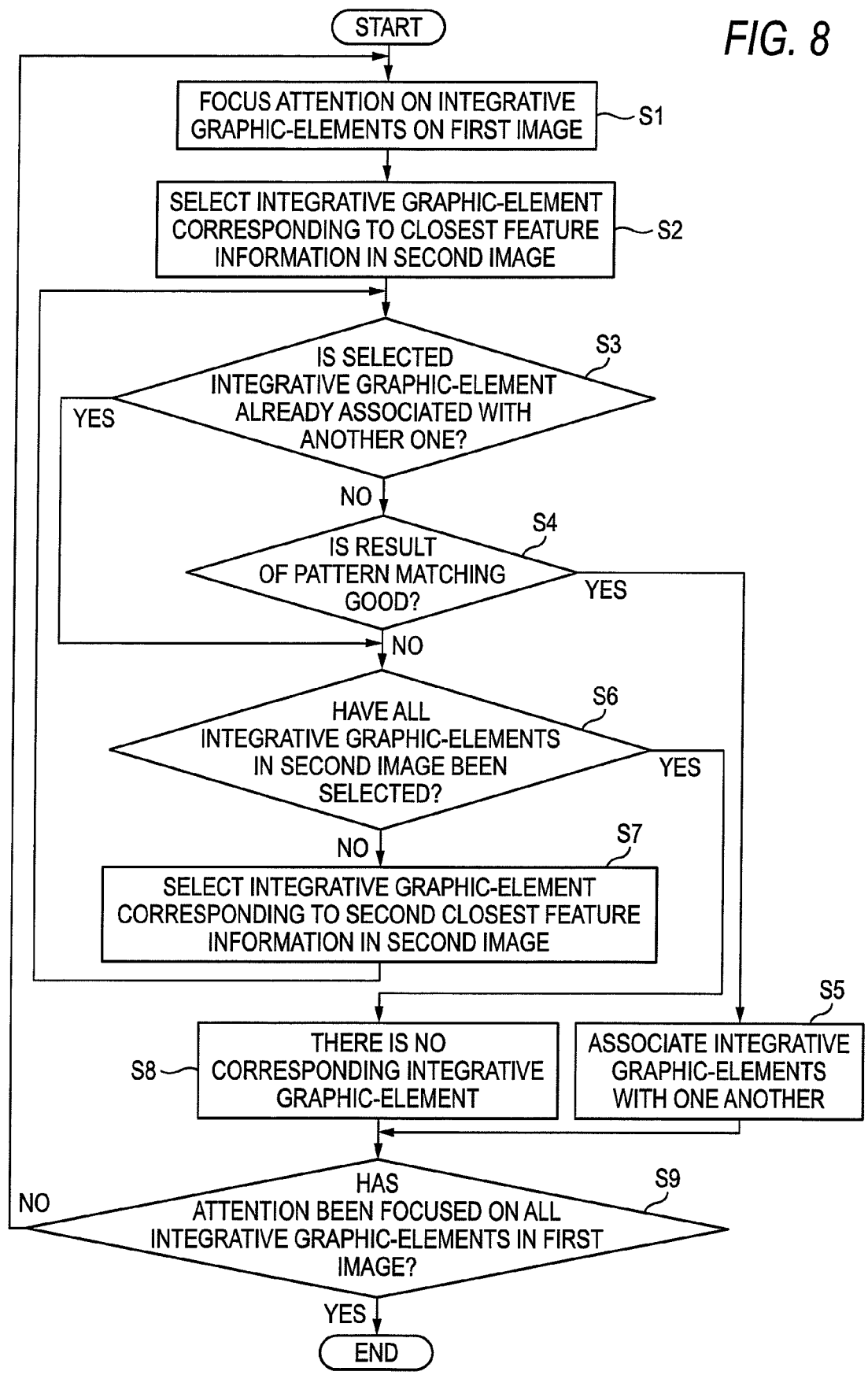
FIG. 8 is a view illustrating an example of algorithm for association performed by the correspondence relation acquisition portion in a case where the correspondence relation acquisition portion associates a single integrative graphic-element with at most another single integrative graphic-element.

FIG. 8 is a flowchart illustrating the algorithm for causing the correspondence relation acquisition portion 24 to associate a single integrative graphic-element with at most another single integrative graphic-element. First, in step S1, attention is focused on one of integrative graphic-elements included in the first image. In the next step S2, the attention integrative graphic-element, among integrative graphic-elements included in the second image, the integrative graphic-element, whose feature information is closest to the attention integrative graphic-element, is selected. Then, in step S3, it is determined whether the selected integrative graphic-element has been associated with another integrative graphic-element.

If the selected integrative graphic-element has not already been associated with another integrative graphic-element, the algorithm proceeds to step S4 in which pattern-matching is performed between the attention integrative graphic-element and the selected integrative graphic-element and in which a result of the pattern-matching is determined. As described above, if the result of the pattern-matching is good, that is, if it is determined that the degree of commonality between both the integrative graphic-elements is equal to or higher than a certain level, the algorithm proceeds to step S5 in which both the integrative graphic-elements are associated with each other. On the other hand, if the result of the pattern-matching is not good, and if it is determined that the integrative graphic-element selected in step S3 has already been associated with another integrative graphic-element, the algorithm proceeds to step S6.

In step S6, it is determined whether all the integrative graphic-elements included in the second image have been selected. If it is determined that not all of the integrative graphic-elements included in the second image have been selected yet, the algorithm proceeds to step S7 in which, among the integrative graphic-elements included in the second image, the integrative graphic-element, the feature information of which is the second closest to that of the attention integrative graphic-element, is selected, as compared with the last selected integrative graphic-element. Then, the algorithm returns to step S3. Subsequently, the above process is repeated.

If it is determined in step S6 that all the integrative graphic-elements included in the second image have been selected, the algorithm proceeds to step S8 in which it is determined that no integrative graphic-elements correspond to the attention integrative graphic-element, and that no integrative graphic-elements is associated with the attention integrative graphic-element.

If it is determined in step S5 that the integrative graphic-elements are associated with each other, or if it is determined in step S8 that no integrative graphic-elements are associated with each other, the algorithm proceeds to step S9 in which it is determined whether attention has been focused on all the integrative graphic-elements included in the first image. If not all of the integrative graphic-elements included in the first image have attracted attention, the algorithm returns to step S1 in which attention is focused on a new integrative graphic-element. Subsequently, and similarly, the above process is repeated. If attention has been focused on all the integrative graphic-elements included in the first image, processing according to the algorithm is finished.

The above algorithm is an example of an algorithm for causing the correspondence relation acquisition portion 24 to associate a single integrative graphic-element with at most another single integrative graphic-element. Alternatively, the association can be performed such that candidates of integrative graphic-elements included in the second image, which are respectively associated with the integrative graphic-elements included in the first image, are arranged in the ascending order of the degree of resemblance based on the feature information, and that pattern-matching is performed on the integrative graphic-elements in the ascending order of the degree of resemblance based on the feature information, and the association of the integrative graphic-elements with one another is performed. In this case, the integrative graphic-elements included in the second image, which already have been associated therewith, are excluded from the candidates.

Figure 3:
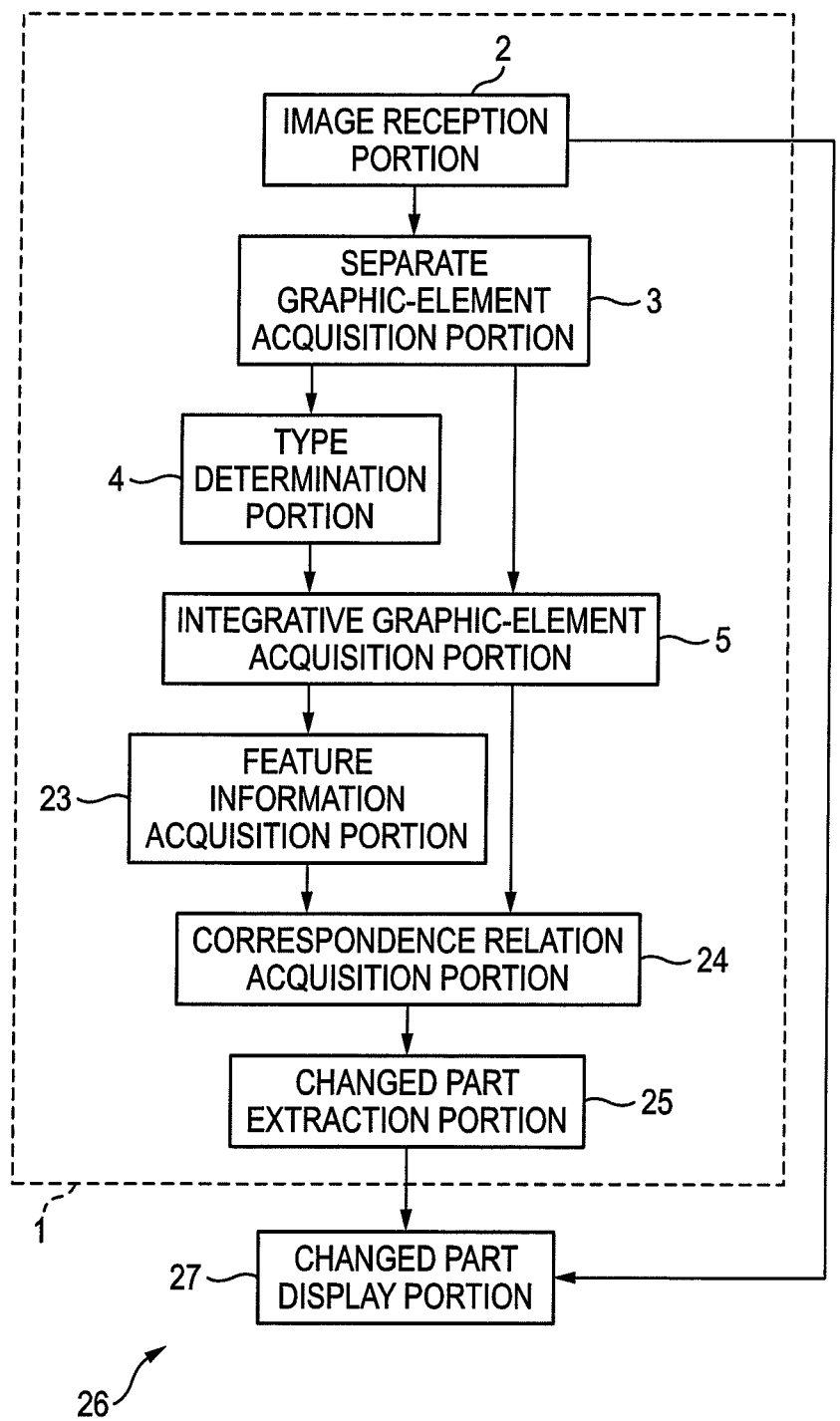
FIG. 3 is a functional block diagram illustrating an apparatus for extracting a changed part of an image according to a second exemplary embodiment of the invention.

Next, an apparatus 26 for displaying a changed part of an image according to a second exemplary embodiment of the invention is described with reference to FIG. 3. FIG. 3 is a functional block view illustrating the apparatus 26 for displaying a changed part of an image according to the second exemplary embodiment. The apparatus 26 for displaying a changed part of an image according to the present exemplary embodiment includes the apparatus 1 for extracting a changed part of an image according to the above first exemplary embodiment. Components common to both of the exemplary embodiments are designated with the same reference numerals. Thus, duplicate description of such components is omitted.

The apparatus 26 for displaying a changed part of an image is configured by adding, to the apparatus 1 for extracting a changed part of an image, a changed part display portion 27 functioning as a changed part display means. According to the present exemplary embodiment, the changed part display means 27 superimposes, onto a first image or a second image received from the image reception portion 2, a changed part transferred from the changed part extraction portion 25. Then, the changed part display means 27 displays the superimposed images on a display device such as a monitor so that a user of the apparatus 26 for displaying a changed part of an image can recognize the changed part. If the changed part is superimposed on the first image, the changed part display portion 27 displays the changed part by regarding the first image as being updated into the second image so that a user can recognize the part added to the first image or the part deleted from the first image. Such a display is can be set so that changed parts are displayed by changing colors, e.g., a part deleted from the first image is displayed in red, and that a part added to the first image is displayed in blue. Alternatively, the luminance of light used to display a changed part or the type of a line representing the changed part can be altered. Alternatively, the changed part can be displayed by blinking. Thus, various display methods can be used. If there is a deviation in the relative position between the integrative graphic-element included in the first image and the corresponding integrative graphic-element included in the second image at that time, the changed part is displayed as obtained by the parallel translation of the second image to eliminate the deviation in the relative position. That is, the part added to or deleted from the integrative graphic-element included in the first image is displayed at a correct position with respect to the integrative graphic-element. Such a deviation in the relative position can be set to be a deviation in the relative-positional relation corresponding to the highest degree of commonality between both the integrative graphic-elements respectively included in the first and second images when the correspondence relation acquisition portion 24 performs pattern-matching the integrative graphic-elements. However, such a deviation in the relative position according to the invention is not limited thereto.

Next, for readily understanding the invention, an operation of the apparatus 26 for displaying a changed part of an image is described hereinafter with reference to a practical example by referring to FIGS. 3, and 4A to 4C. However, the operation of the apparatus 26 for displaying a changed part of an image described hereinafter is mere an example thereof. An operation of the apparatus according to the gist of the invention is not limited thereto.

Figure 4A:
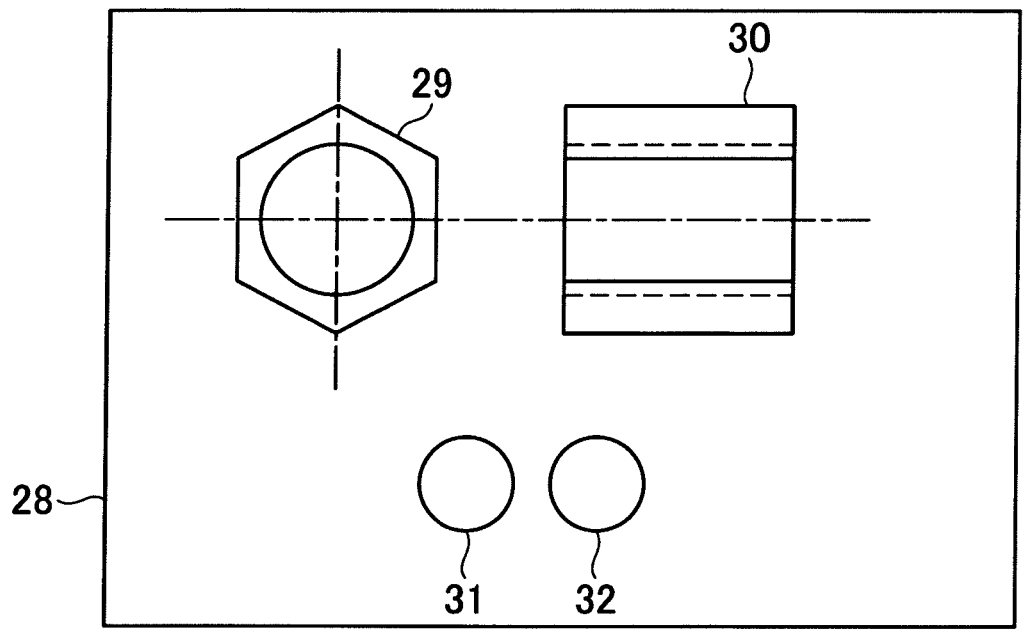
FIG. 4A is a view illustrating a first image as an example of a target image of the apparatus according to the second exemplary embodiment.
Figure 4B:
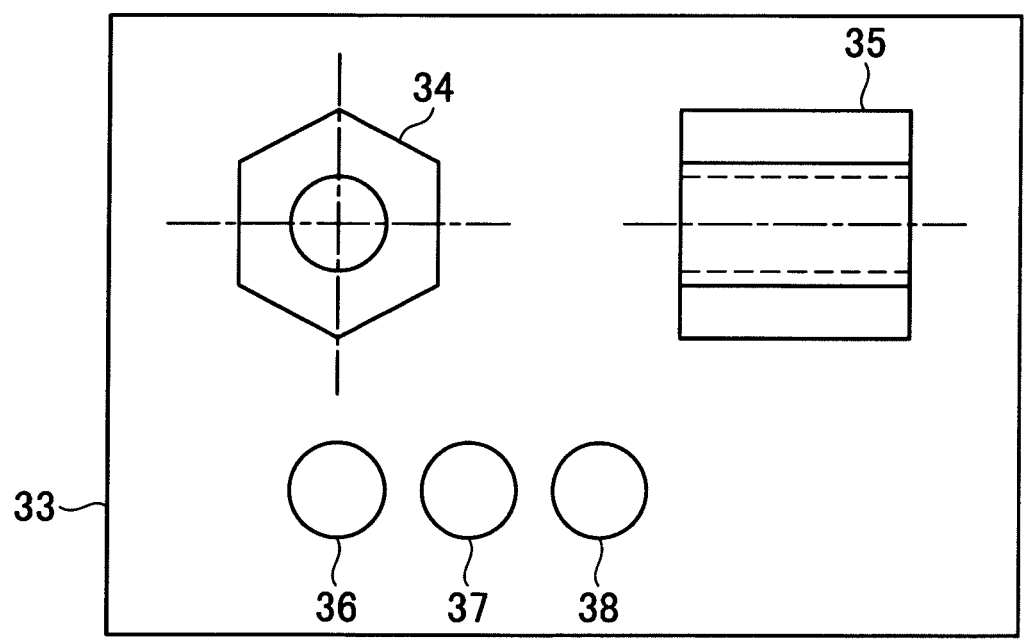
FIG. 4B is a view illustrating a second image as an example of a target image of the apparatus according to the second exemplary embodiment.

FIG. 4A is a view illustrating an example of a first image 28. Integrated graphic-elements 29 to 32 are included in the first image 28. FIG. 4B is a view illustrating an example of a second image 33. Integrated graphic-elements 34 to 38 are included in the second image 33. The second image 33 is obtained by partly changing the first image 28. More specifically, both the images 28 and 33 are such that the integrative graphic-element 29 is changed into a new integrative graphic-element 34 by changing the size of a circle included in the integrative graphic-element 29. The images 28 and 33 have the following differences. That is, the position of the integrative graphic-element 30 itself in the image 28 is changed to the right. In addition, the position of each dashed line in the integrative graphic-element 30 in the image 28 is changed. An integrative graphic-element 36 is added to the image 28.

Referring back to FIG. 3, the apparatus 26 for displaying a changed part of an image receives the first image 28 and the second image 33 at the image reception portion 2. The apparatus 26 for displaying a changed part of an image acquires integrative graphic-elements 29 to 32 and 34 to 38 at the separate graphic-element acquisition portion 3, the type determination portion 4, and the integrative graphic-element acquisition portion 5. The apparatus 26 for displaying a changed part of an image acquires feature information of each integrative graphic-element at the feature information acquisition portion 23. Then, the correspondence relation acquisition portion 24 determines based on the feature information and a result of pattern-matching that the integrative graphic-element 34 corresponds to the integrative graphic-element 29, and that the integrative graphic-element 35 corresponds to the integrative graphic-element 30. The same result is obtained by pattern-matching between the integrative graphic-element 31 and each of the integrative graphic-elements 36 to 38. However, information representing the coordinates of the center of gravity of the integrative graphic-elements 36 to 38 represents the position of the integrative graphic-elements 36 to 38 and is used as feature information. Thus, it is determined that the integrative graphic-element 37 corresponds to the integrative graphic-element 31. Similarly, it is determined that the integrative graphic-element 38 corresponds to the integrative graphic-element 32, and that no integrative graphic-elements correspond to the integrative graphic-element 36. Information representing results of such determination is transferred to the changed part display portion 27 as information representing the correspondence relation.

Figure 4C:
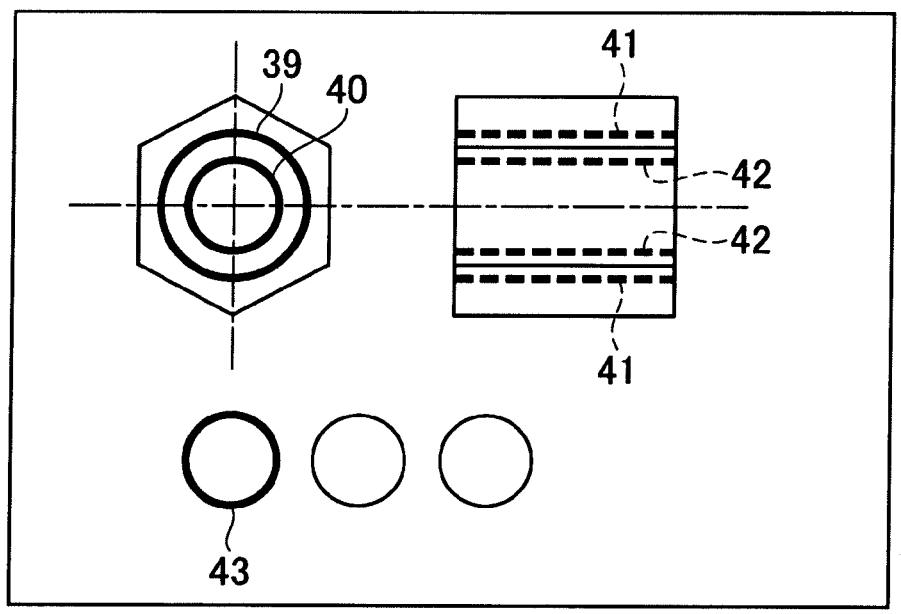
FIG. 4C is a view illustrating an example of display of a changed part.

The changed part display portion 27 displays the image 28 as illustrated in FIG. 4C by superimposing onto the image 28 the changed part represented by the transferred information. FIG. 4C illustrates an example of display of the changed part. In FIG. 4C, each part indicated with thick lines is a part displayed as the changed part. Although FIGS. 4A and 4B don't clearly show, the images can be displayed such that a part deleted from the first image 28 can clearly be distinguished from a part added thereto. For example, as described above, the deleted part is displayed in red, while the added part is displayed in blue. In this example, a circle 39 is displayed as the deleted part, while a circle 40 is displayed as the added part. A dashed line 41 is displayed as the deleted part, while a dashed line 42 is displayed as the added part. Simultaneously, the dashed line 42 is subjected to parallel translation to eliminate a deviation in the relative position between the integrative graphic-element 30 included in the first image 28 and the integrative graphic-element 35 included in the second image 33. Thus, the position of the dashed line 42 with respect to the integrative graphic-element 30 included in the first image 28 can correctly be displayed. A circle 43 is displayed as the added part.

Figure 5:
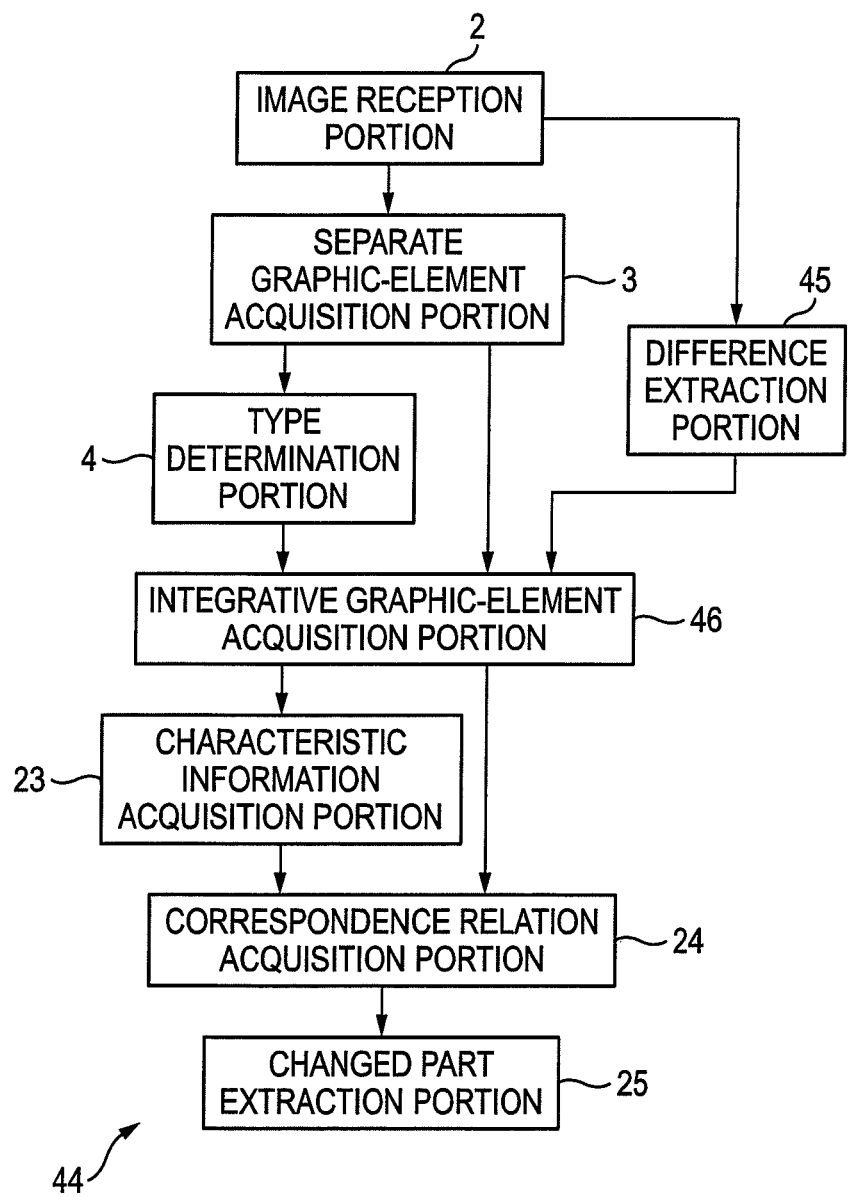
FIG. 5 is a functional block diagram illustrating an apparatus for extracting a changed part of an image according to a third exemplary embodiment of the invention.

Next, an apparatus 44 for extracting a changed part of an image according to a third exemplary embodiment of the invention is described with reference to FIG. 5. FIG. 5 is a functional block view illustrating the apparatus 44 for extracting a changed part of an image according to the present exemplary embodiment. The apparatus 44 for extracting a changed part of an image differs from the apparatus 1 (see FIG. 1) for extracting a changed part of an image according to the first exemplary embodiment, in that a difference extraction portion 45 functioning as a difference extraction means is added to the apparatus 1 therefor. Most of the rest of the apparatus is common to the apparatuses 1 and 44. Thus, each component common to both the apparatuses 1 and 44 is designated with the same reference numeral. Thus, duplicate description of such components is omitted. The difference extraction means is a means for extracting the difference between the first image and the second image.

The difference extraction portion 45 extracts the difference between the first image and the second image received by the image reception portion 2 and transfers information representing the extracted difference to an integrative graphic-element acquisition portion 46. Thus, the difference between the first image and the second image includes a part deleted from the first image and a part added to the first image by regarding the first image as updated to the second image. At that time, a graphic-element whose relative position in each image is changed between the first image and the second image is extracted as the difference therebetween.

The integrative graphic-element acquisition portion 46 acquires a integrative graphic-element based on a separate graphic-element acquired by the separate graphic-element acquisition portion 3 and the type of each separate graphic-element determined by the type determination portion 4, similarly to the integrative graphic-element acquisition portion 5 (see FIG. 1) in the apparatus 1 for extracting a changed part of an image according to the first exemplary embodiment. At that time, the integrative graphic-element acquisition portion 46 associates each separate graphic-element corresponding to the difference extracted by the difference extraction portion 45 with another separate graphic-element. That is, attention is focused on a separate graphic-element a part of which includes a part deleted from the first image and/or a part added thereto, which is the difference extracted by the difference extraction portion 45. The integrative graphic-element acquisition portion 46 associates the separate graphic-element, on which attention is focused, with another separate graphic-element by the method described in the above first exemplary embodiment. At that time, attention is not focused on the separate graphic-element that doesn't include the difference extracted by the difference extraction portion 45. Thus, the separate graphic-element which doesn't include the difference is not acquired as a part of the integrative graphic-element, unless this separate graphic-element is not associated directly or indirectly with another separate graphic-element.

This process is described in more detail hereinafter with reference to FIGS. 9 to 11. In a first image 53 illustrated in FIG. 9, characters 54a to 54f are moved character by character to the right to those 56a to 56f include in a second image 55.

Figure 10:
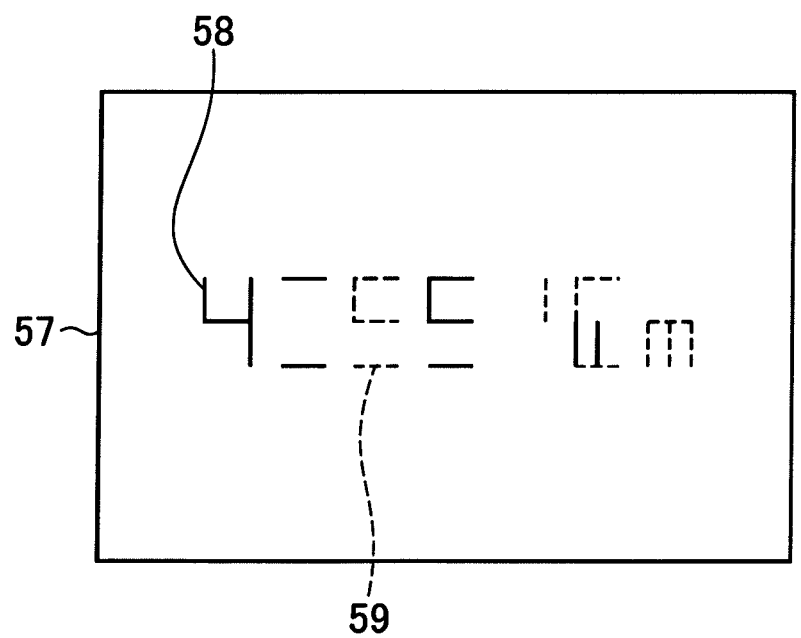
FIG. 10 is a view illustrating an example of a difference image between the first image and the second image illustrated in FIG. 9.

At that time, the difference extraction portion 45 (see FIG. 5) according to the present exemplary embodiment calculates the difference between the first image 53 and the second image 55 and acquires a difference image 57 illustrated in FIG. 10. A difference 58 corresponding to the characters 54*a* to 54*f* included in the first image 53 is displayed with a solid line in the difference image 57. A difference 59 corresponding to the characters 56*a* to 56*f* included in the second image 55 is displayed with a dashed line.

Figure 11:
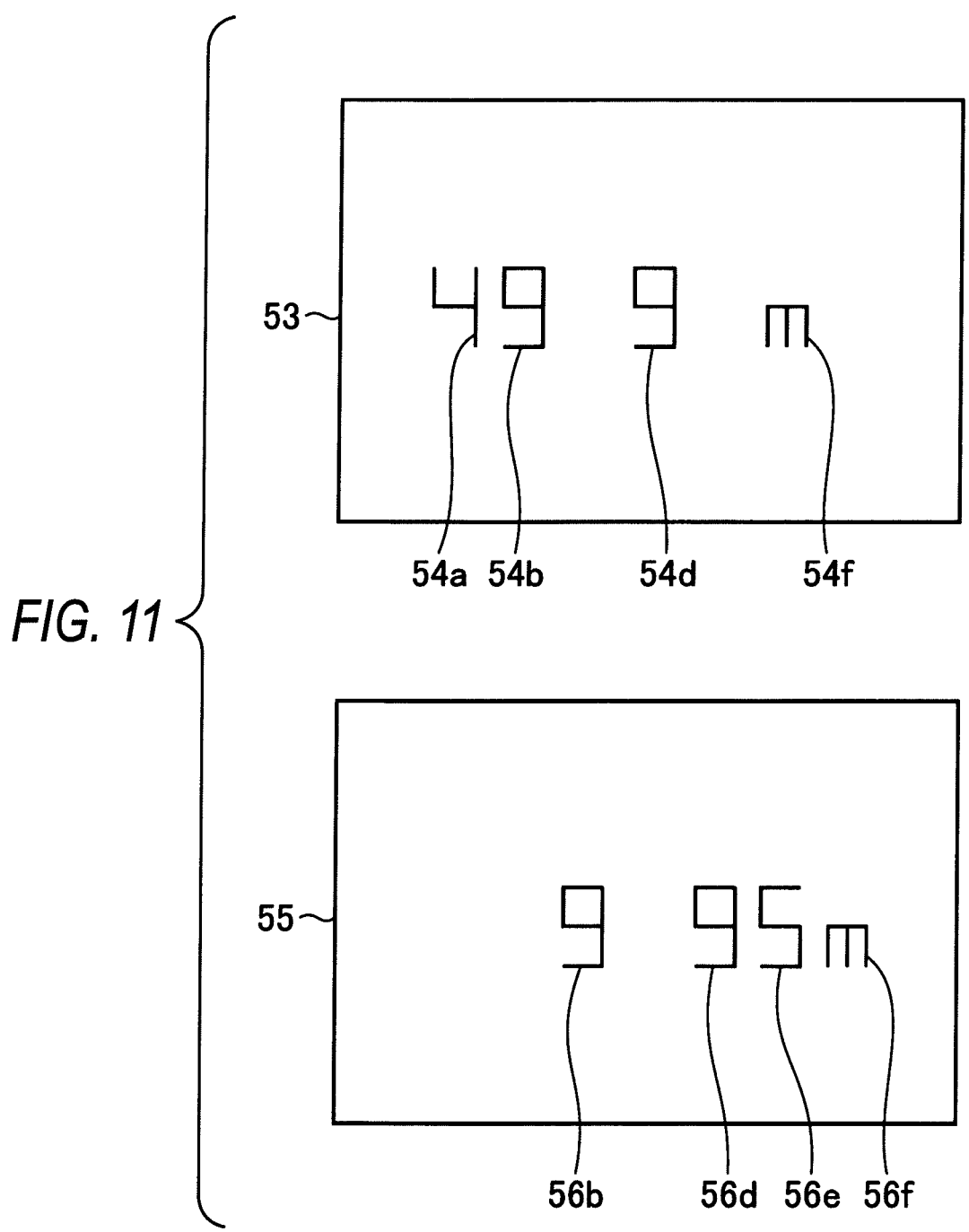
FIG. 11 is a view illustrating separate graphic-elements according to the difference between the first image and the second image.

FIG. 11 is a view illustrating a separate graphic-element corresponding to a difference. That is, the characters 54*a*, 54*b*, 54*d*, and 54*f* in the first image 53 are separate graphic-elements corresponding to the difference. The characters 56*b*, 56*d*, 56*e*, and 56*f* in the second image 55 are separate graphic-elements corresponding to the difference.

If the integrative graphic-element acquisition portion 46 (see FIG. 5) is assumed to acquire an integrative graphic-element corresponding only to separate graphic-elements that correspond to the difference, an integrative graphic-element is acquired as illustrated in FIG. 11. If the feature information acquisition portion 23, the correspondence relation acquisition portion 24, and the changed part extraction portion 25 (concerning each of these portions, see FIG. 5) performs processing, characters 54*b*, 54*d*, and 54*f* are associated with characters 56*b*, 56*d*, and 56*f*, respectively. Thus, it is determined that there is no changed part corresponding to the characters. On the other hand, it is determined that a graphic-element corresponding to the character 54*a* included in the first image 53 is not present in the second image 55. In addition, it is determined that a graphic-element corresponding to the character 56*f* included in the second image 55 is not present in the first image 53. Accordingly, the characters 54*a* and 56*f* are extracted as changed parts.

Figure 9:
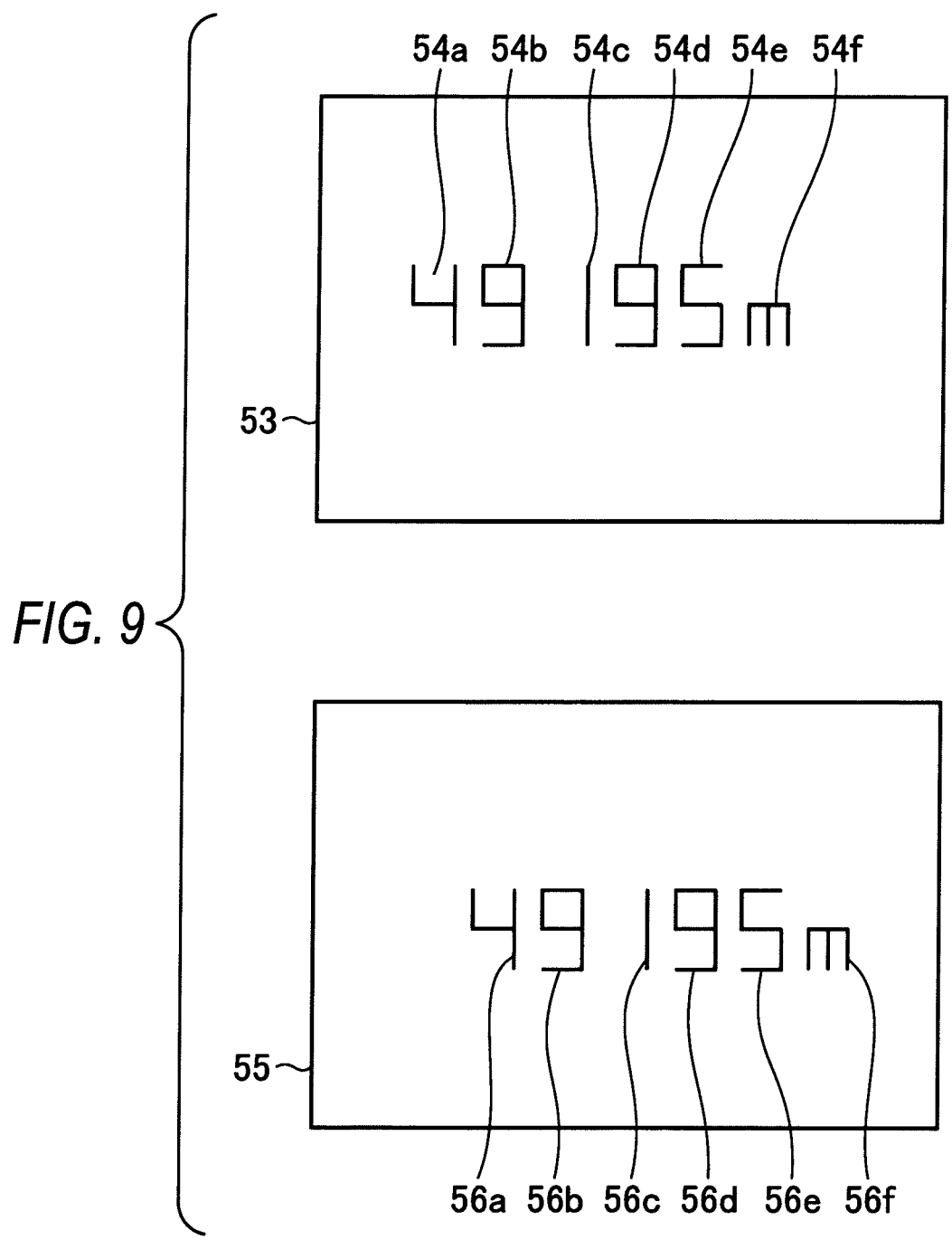
FIG. 9 is a view illustrating an example of each of a first image and a second image serving as target images of the apparatus according to the exemplary embodiment illustrated in FIG. 1.

On the other hand, if the integrative figure acquisition portion 46 is assumed to associate a separate graphic-element, which doesn't correspond to the difference, directly or indirectly with a separate graphic-element, which corresponds to the difference, the character 54*c* included in the first image 53 illustrated in FIG. 9 adjoins the characters 54*b* and 54*d* corresponding to the difference and are thus associated therewith. That is, the character 54*c* is associated directly with the characters 54*b* and 54*d*. Similarly, the character 54*e* is associated directly with the characters 54*d* and 54*f*. Consequently, all the characters 54*a* to 54*f* are associated with one another and obtained as one integrative graphic-element. In the second image 55, the characters 56*a* and 56*c* are associated with the other characters 56*b*, 56*d*, 56*e*, and 56*f*. Thus, the characters 56*a* to 56*f* are acquired as one integrative graphic-element.

Thus, in a subsequent process, the integrative graphic-elements are associated with each other. Accordingly, no changed part is extracted between the first image 53 and the second image 55.

In the above example, the separate graphic-elements which don't correspond to the difference are associated directly with the separate graphic-elements corresponding to the difference. However, it is preferable that the separate graphic-elements which don't correspond to the difference are associated indirectly with the separate graphic-elements corresponding to the difference. That is, if the separate graphic-elements which don't correspond to the difference are associated with the separate graphic-elements corresponding to an optional difference, it is advisable to associate, based on the geometric relation with the separate graphic-elements which don't correspond to the difference, the separate graphic-elements with separate graphic-elements which don't correspond to another difference.

A practical example of processing by the changed part extraction apparatus 44 according to the present exemplary embodiment is described hereinafter with reference to the first image 28 according to the second exemplary embodiment illustrated in FIG. 4A and the second image 33 illustrated in FIG. 4B. There are differences between the integrative graphic-elements 29 and 30 included in the first image 28 and those 34 and 35 included in the second image 33. That is, the differences are change in the size of a circle between the integrative graphic-elements 29 and 34, change in the position between the integrative graphic-elements 30 and 35, and change in the position of the dashed line. Therefore, the integrative graphic-elements 29, 30, 34, and 35 are acquired by the integrative graphic-element acquisition portion 46. In addition, the integrative graphic-element 36 is a difference added to the first image 28. Thus, the integrative graphic-element 36 is acquired by the integrative graphic-element acquisition portion 46. There is no change corresponding to each of the integrative graphic-elements 31, 32, 37, and 38 between the first image 28 and the second image 33. In addition, each of the integrative graphic-elements 31, 32, 37, and 38 is neither directly nor indirectly associated with separate graphic-elements each of which changes between the first image 28 and the second image 33. Accordingly, each of the integrative graphic-elements 31, 32, 37, and 38 is not acquired by the integrative graphic-element acquisition portion 46 as an integrative graphic-element. Consequently, the integrative graphic-elements transferred to the feature information acquisition portion 23 and the correspondence relation acquisition portion 24 are those 29, 30, and 34 to 36. Thus, in the present exemplary embodiment, sometimes, the number of integrative graphic-elements to be processed by the feature information acquisition portion 23 and the correspondence relation extraction portion 24 decreases, as compared with the first exemplary embodiment. This description is only for illustrative purpose and for readily understanding operations of the difference extraction portion 45 and the integrative graphic-element acquisition portion 46. The gist of the invention is not limited to this example.

Figure 6:
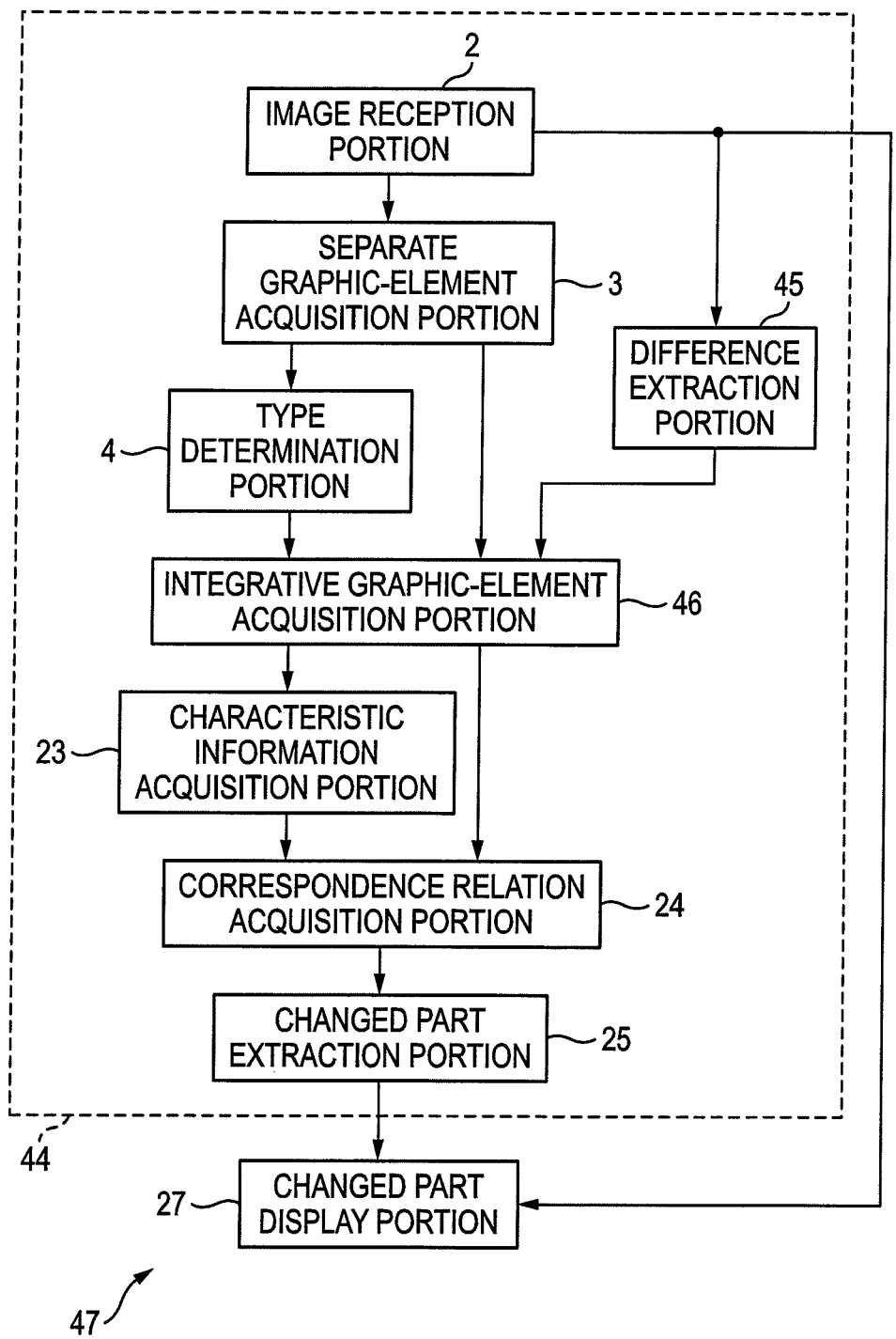
FIG. 6 is a functional block diagram illustrating an apparatus for extracting a changed part of an image according to a fourth exemplary embodiment of the invention.

An apparatus 47 for displaying a changed part of an image according to a fourth exemplary embodiment of the invention is described with reference to FIG. 6. FIG. 6 is a functional block view illustrating an apparatus 47 for displaying a changed part of an image according to a fourth exemplary embodiment of the invention. The apparatus 47 for displaying a changed part of an image according to the present exemplary embodiment is obtained by adding, to an apparatus 44 for extracting a changed part of an image according to the third exemplary embodiment, a changed part display portion 27 in an apparatus 26 (see FIG. 3) for displaying a changed part of an image according to the second exemplary embodiment. Components common to all of the above exemplary embodiments are designated with the same reference numerals. Thus, duplicate description of such components is omitted.

Even in the changed part display apparatus 47 according to the present exemplary embodiment, similarly to the apparatus 26 (see FIG. 3) for displaying a changed part of an image according to the second exemplary embodiment, a changed part transferred from the changed part extraction portion 25 is superimposed on the first image or the second image received by the image reception portion 2, and displayed on a display device such as a monitor such that a user of the apparatus 26 for displaying a changed part can recognize a changed part.

The functional block views and flowcharts shown in the exemplary embodiment illustrate examples for implementing the exemplary embodiments. The configuration, the arrangement of functional blocks and a flow of a control operation according to the invention are not limited to those illustrated by the functional block views and the flowcharts.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An apparatus for extracting a changed part of an image, comprising:
    a separate graphic-element acquisition unit configured to acquire first separate graphic-elements included in a first image and second separate graphic-elements included in a second image;
    an integrative graphic-element acquisition unit configured to acquire a first integrative graphic-element including the first separate graphic-elements by associating the first separate graphic-elements with one another based on a geometric relation between the first separate graphic-elements, and to acquire a second integrative graphic-element including the second separate graphic-elements by associating the second separate graphic-elements with one another based on a geometric relation between the second graphic-elements;
    a correspondence relation acquisition unit configured to acquire a correspondence relation between the first integrative graphic-element and the second integrative graphic-element; and
    a changed part extraction unit configured to eliminate, in response to a deviation in relative position between the first integrative graphic-element and the second integrative graphic-element, the deviation in relative position, and to extract, based on the correspondence relation and in response to determining that a change other than a positional difference exists between the first integrative graphic-element and the second integrative graphic element, a part corresponding to the change.

2. The apparatus for extracting a changed part of an image according to claim 1, further comprising:
    a type determination unit configured to determine a type of each of the first separate graphic-elements,
    wherein the integrative graphic-element acquisition unit associates the first separate graphic-elements with each other based on a criterion according to the type of each of the first separate graphic-elements.

3. The apparatus for extracting a changed part of an image according to claim 2, wherein the integrative graphic-element acquisition unit, if the type of one of the first separate graphic-elements is a frame which includes separate regions therein, associates the frame-type first separate graphic-element with another one of the first separate graphic-elements existing in one of the separate regions, and said one of the separate regions is not a maximum one of the separate regions in the frame.

4. The apparatus for extracting a changed part of an image according to claim 1, further comprising:
    a difference extraction unit configured to extract a difference between the first image and the second image,
    wherein the integrative graphic-element acquisition unit associates one of the first separate graphic-elements corresponding to the difference extracted by the difference extraction unit with another one of the first separate graphic-elements.

5. The apparatus for extracting a changed part of an image according to claim 1, further comprising:
    a feature information acquisition unit configured to acquire feature information of the first integrative graphic-element and feature information of the second integrative graphic-element,
    wherein the correspondence relation acquisition unit acquires the correspondence relation between the first and second integrative graphic-elements based on the feature information acquired from the first and second integrative graphic-elements.

6. The apparatus for extracting a changed part of an image according to claim 1, wherein the correspondence relation acquisition unit acquires the correspondence relation between the first and second integrative graphic-elements by pattern-matching.

7. The apparatus for extracting a changed part of an image according to claim 1, wherein the correspondence relation acquisition unit associates the first integrative graphic-element with at most the second integrative graphic element.

8. The apparatus for extracting a changed part of an image according to claim 4, wherein the integrative graphic-element acquisition unit associates the one of the separate graphic-elements corresponding to the difference between the first image and the second image directly or indirectly with another one of the first separate graphic-elements which does not correspond to the difference.

9. An apparatus for displaying a changed part of an image, comprising:
    the apparatus for extracting a changed part of an image according to claim 1; and
    a changed part display unit configured to display the changed part.

10. A non-transitory computer readable medium storing a computer readable program executable by a computer for causing a computer to operate as an apparatus for extracting a changed part of an image, the process comprising:
    acquiring first separate graphic-elements included in a first image and second separate graphic-elements included in a second image;
    acquiring a first integrative graphic-element including the first separate graphic-elements by associating the first separate graphic-elements with one another based on a geometric relation between the first separate graphic-elements;
    acquiring a second integrative graphic-element including the second separate graphic-elements by associating the second separate graphic-elements with one another based on a geometric relation between the second graphic-elements;
    acquiring correspondence relation between the first integrative graphic-element and the second integrative graphic-element included in the second image;
    eliminating, in response to a deviation in relative position between the first integrative graphic-element and the second integrative graphic element, the deviation in relative position; and
    extracting, based on the correspondence relation and in response to determining that a change other than a positional difference exists between the first integrative graphic-element and the second integrative graphic element, a part corresponding to the change.

11. The apparatus for extracting a changed part of an image according to claim 1, wherein the type of the first separated graphic-elements is at least one of a point, a line segment, a circular arc, a character, a region, an ellipse, a rectangle, and a fragment of a regular polygon.

12. The apparatus for extracting a changed part of an image according to claim 1, wherein in response to the changed part extraction unit determining that a change exists between the first image and the second image, the changed part extraction unit identifies whether the part corresponding to the change was added to or deleted from the first image.

13. An apparatus for displaying a changed part of an image, the apparatus comprising:
- the apparatus for extracting a changed part of an image according to claim 12; and
- a changed part display unit configured to display the part corresponding to the change,
- wherein in response to the changed part extraction unit identifying that the part corresponding to the change was added to the first image, the changed part display unit displays the changed part in a first color, and in response to the changed part extraction unit identifying that the part corresponding to the change was deleted from the first image, the changed part display unit displays the changed part in a second color different from the first color.

* * * * *